(12) United States Patent
Sato et al.

(10) Patent No.: US 10,764,454 B1
(45) Date of Patent: Sep. 1, 2020

(54) IMAGE READING APPARATUS AND IMAGE FORMING SYSTEM

(71) Applicant: FUJI XEROX CO., LTD., Tokyo (JP)

(72) Inventors: Kazunobu Sato, Kanagawa (JP); Hiromichi Sawamura, Kanagawa (JP); Kaoru Furusawa, Kanagawa (JP); Hosana Kimura, Kanagawa (JP); Atsuhiro Itoh, Kanagawa (JP); Minoru Aizumi, Kanagawa (JP); Yuichi Tanaka, Kanagawa (JP); Taketo Kondo, Kanagawa (JP); Akari Fukuda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/655,433

(22) Filed: Oct. 17, 2019

(30) Foreign Application Priority Data

Jun. 12, 2019 (JP) .................................. 2019-109478

(51) Int. Cl.
*H04N 1/00* (2006.01)

(52) U.S. Cl.
CPC ..... *H04N 1/00657* (2013.01); *H04N 1/00588* (2013.01); *H04N 1/00663* (2013.01); *H04N 2201/0094* (2013.01)

(58) Field of Classification Search
CPC ....... H04N 2201/0081; H04N 1/00795; H04N 1/00806; H04N 1/00827; H04N 2201/3274; H04N 1/00326; H04N 1/00342; H04N 1/00567; H04N 1/00588; H04N 1/00602; H04N 1/0062; H04N 1/00628; H04N 1/00631; H04N 1/00649; H04N 1/00705; H04N 1/12; H04N 1/193; H04N 1/32138; H04N 2201/3216; H04N 2201/3226; H04N 1/32101; H04N 2201/0091; H04N 2201/3242; H04N 2201/325; H04N 2201/3252; G03G 15/60; G03G 15/602; G03G 15/65; G03G 2215/00215;
(Continued)

(56) References Cited

U.S. PATENT DOCUMENTS 5,347,352 A * 9/1994 Morigami .............. G03G 15/60
271/3.01
5,506,658 A * 4/1996 Takemura .............. G03G 15/60
399/21
(Continued)

FOREIGN PATENT DOCUMENTS

JP 2018-133697 A 8/2018

*Primary Examiner* — Negussie Worku
(74) *Attorney, Agent, or Firm* — Oliff PLC

(57) ABSTRACT

An image reading apparatus includes a transport unit, a reader, a detector, and a controller. The transport unit transports a document. The reader reads the transported document. The detector detects whether or not a document bundle prior to being transported is present. While a document in a first document bundle corresponding to a first job is being transported, if the detector detects that a document in a second document bundle corresponding to a second job as a subsequent job is loaded, the controller changes pre-feeding operation for preliminarily pulling a document in the second document bundle into the image reading apparatus in accordance with a pull-in position of the document in the image reading apparatus.

13 Claims, 9 Drawing Sheets

(58) Field of Classification Search
CPC .......... G03G 2215/00329; G06F 3/147; G09G 2370/16; G09G 2380/02
USPC ........................................ 358/498, 496, 497
See application file for complete search history.

(56) References Cited

U.S. PATENT DOCUMENTS

| | | | |
|---|---|---|---|
| 6,035,156 A * | 3/2000 | Okamoto | H04N 1/32101 |
| | | | 399/367 |
| 10,321,006 B2 | 6/2019 | Okawa et al. | |
| 2005/0025543 A1 * | 2/2005 | Watanabe | G03G 15/6558 |
| | | | 399/391 |
| 2007/0264063 A1 * | 11/2007 | Sano | G03G 15/602 |
| | | | 399/367 |
| 2010/0066012 A1 * | 3/2010 | Yamazaki | G03G 15/50 |
| | | | 271/270 |
| 2016/0170355 A1 * | 6/2016 | Heishi | G03G 15/5008 |
| | | | 399/367 |
| 2017/0308019 A1 * | 10/2017 | Nishino | H04N 1/00708 |
| 2017/0351209 A1 * | 12/2017 | Nagano | B65H 5/26 |
| 2018/0160008 A1 * | 6/2018 | Osada | H04N 1/00726 |
| 2018/0176399 A1 * | 6/2018 | Umi | B65H 3/0638 |
| 2018/0183968 A1 * | 6/2018 | Furukawa | H04N 1/00697 |
| 2019/0104228 A1 * | 4/2019 | Arimori | B65H 7/06 |

* cited by examiner

FIG. 6A
RELATED ART

| POSITION OF DOCUMENT CORRESPONDING TO SECOND JOB AT END OF FIRST JOB | SECOND JOB | | |
|---|---|---|---|
| | PRE-FEEDING | DOCUMENT POSITION AFTER PRE-FEEDING | RESULT |
| (I) | YES | (II) | NORMAL |
| (II) | YES | (III) | IMAGE DISPLACEMENT |
| | | (IV) | JAM AT START OF SECOND JOB |
| (III) | YES | (IV) | JAM AT START OF SECOND JOB |
| (IV) | — | — | JAM AT END OF FIRST JOB |

FIG. 6B

| POSITION OF DOCUMENT CORRESPONDING TO SECOND JOB AT END OF FIRST JOB | SECOND JOB | | |
|---|---|---|---|
| | PRE-FEEDING | DOCUMENT POSITION AFTER PRE-FEEDING | RESULT |
| (I) | PERFORM OVER FIXED LENGTH | POSITION SUFFICIENT FOR ACCELERATION | NORMAL |
| (II) | PERFORM OVER VARIABLE LENGTH | POSITION SUFFICIENT FOR ACCELERATION | NORMAL |
| (III) | — | — | JAM AT END OF FIRST JOB |
| (IV) | — | — | JAM AT END OF FIRST JOB |

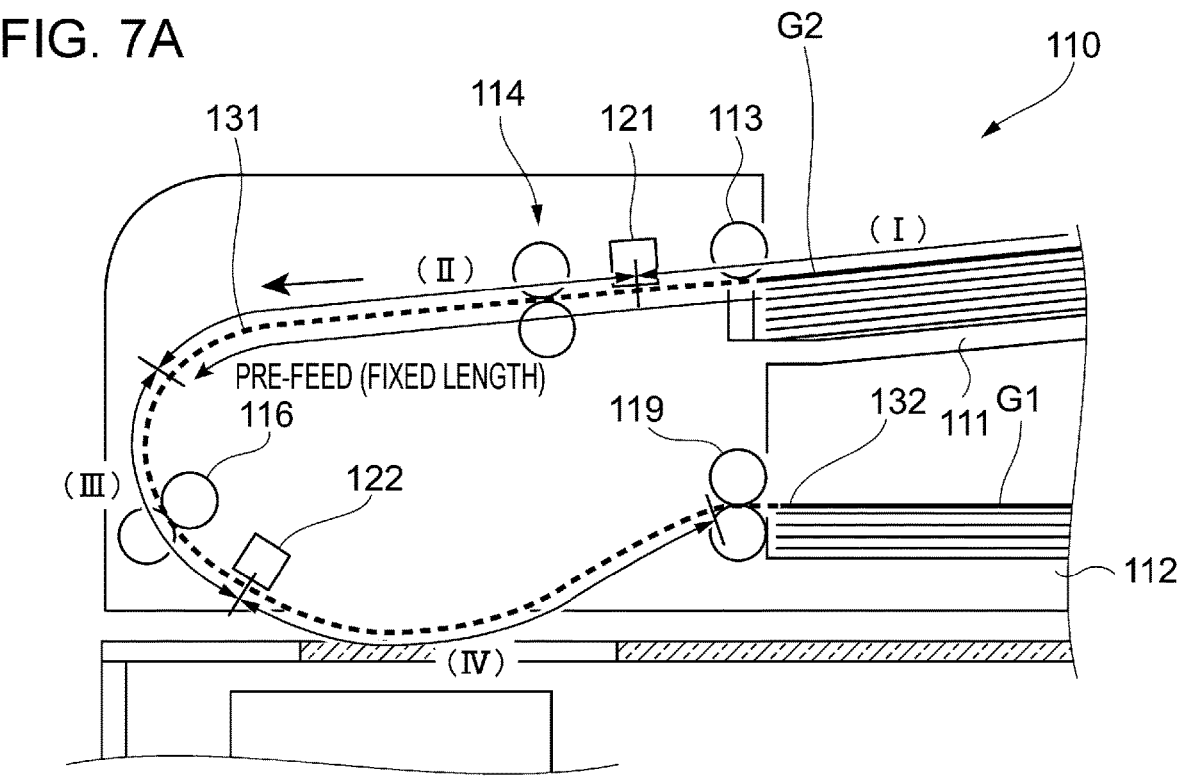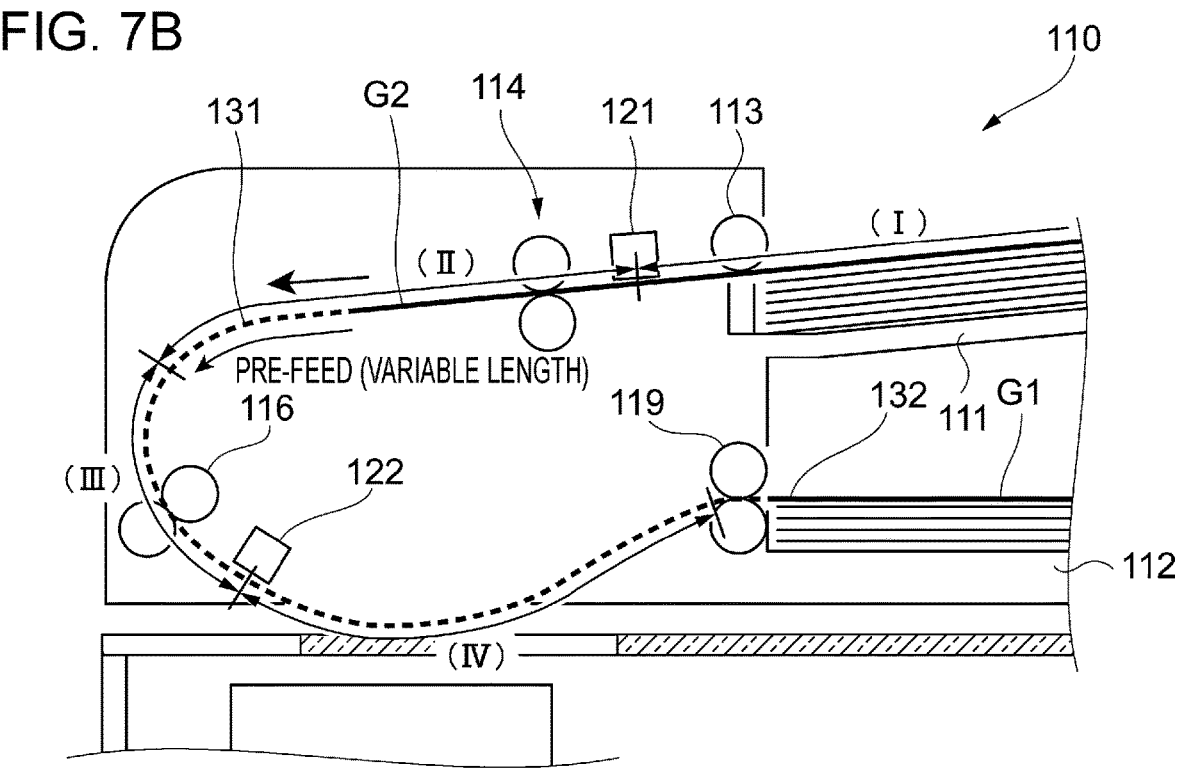

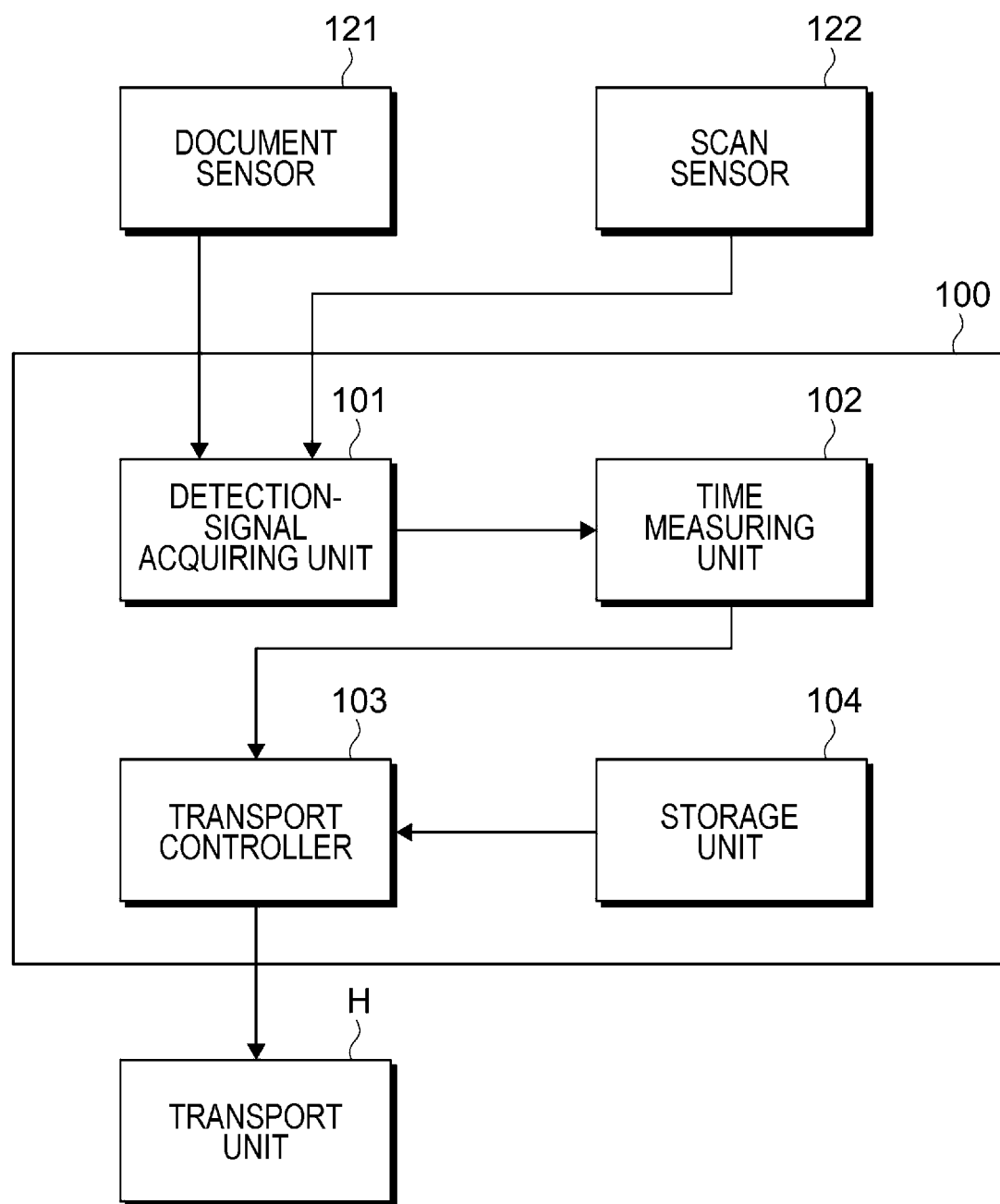

IMAGE READING APPARATUS AND IMAGE FORMING SYSTEM

CROSS-REFERENCE TO RELATED APPLICATIONS

This application is based on and claims priority under 35 USC 119 from Japanese Patent Application No. 2019-109478 filed Jun. 12, 2019.

BACKGROUND

(i) Technical Field

The present disclosure relates to image reading apparatuses and image forming systems.

(ii) Related Art

A known image reading apparatus in the related art reads image information of a document having an image formed thereon so as to function as, for example, a photocopier, a facsimile apparatus, or a computer-input scanner. In an image reading apparatus of this type, light is radiated from a light source disposed on a document transport path, and reflected light from the document is received by an image sensor, so that the image on the document is read.

Japanese Unexamined Patent Application Publication No. 2018-133697 discloses an image reading apparatus in which, when transporting of a document is to be stopped, a read image of a previous document is invalidated if the trailing edge of the previous document has not passed a rear-surface reading position, and validates the read image of the previous document if the trailing edge of the previous document has passed the rear-surface reading position.

There is an image reading apparatus that has a document feeder having a function for transporting documents one-by-one from a document bundle and reading each document by using a reader. In this document feeder, for example, a driving roller and a driving motor are used as a transport unit that transports each document. Sometimes, the transport unit used is of a clutchless type in which the driving roller and the driving motor are actuated in synchronization with each other without using a clutch. However, in such a clutchless transport unit, it is not possible to transport a preceding document bundle and a subsequent document bundle separately. If the subsequent document bundle is placed before the reading process performed on the preceding document bundle is completed, a document in the subsequent document bundle may sometimes be pulled into the apparatus. This may result in an improper reading process performed on the document in the subsequent document bundle.

SUMMARY

Aspects of non-limiting embodiments of the present disclosure relate to an image reading apparatus that may properly read a document even if the document is a document in a subsequent document bundle pulled into the apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image reading apparatus including a transport unit, a reader, a detector, and a controller. The transport unit transports a document. The reader reads the transported document. The detector detects whether or not a document bundle prior to being transported is present. While a document in a first document bundle corresponding to a first job is being transported, if the detector detects that a document in a second document bundle corresponding to a second job as a subsequent job is loaded, the controller changes prefeeding operation for preliminarily pulling a document in the second document bundle into the image reading apparatus in accordance with a pull-in position of the document in the image reading apparatus.

BRIEF DESCRIPTION OF THE DRAWINGS

An exemplary embodiment of the present disclosure will be described in detail based on the following figures, wherein:

FIGS. 6A and 6B illustrate second control performed on the document feeder by the controller;

FIGS. 7A and 7B, together with FIG. 6B, illustrate the second control performed in this exemplary embodiment;

FIG. 9 is a block diagram illustrating a functional configuration example of the controller according to this exemplary embodiment.

DETAILED DESCRIPTION

Overall Configuration of Image Forming Apparatus 10

Figure 1:
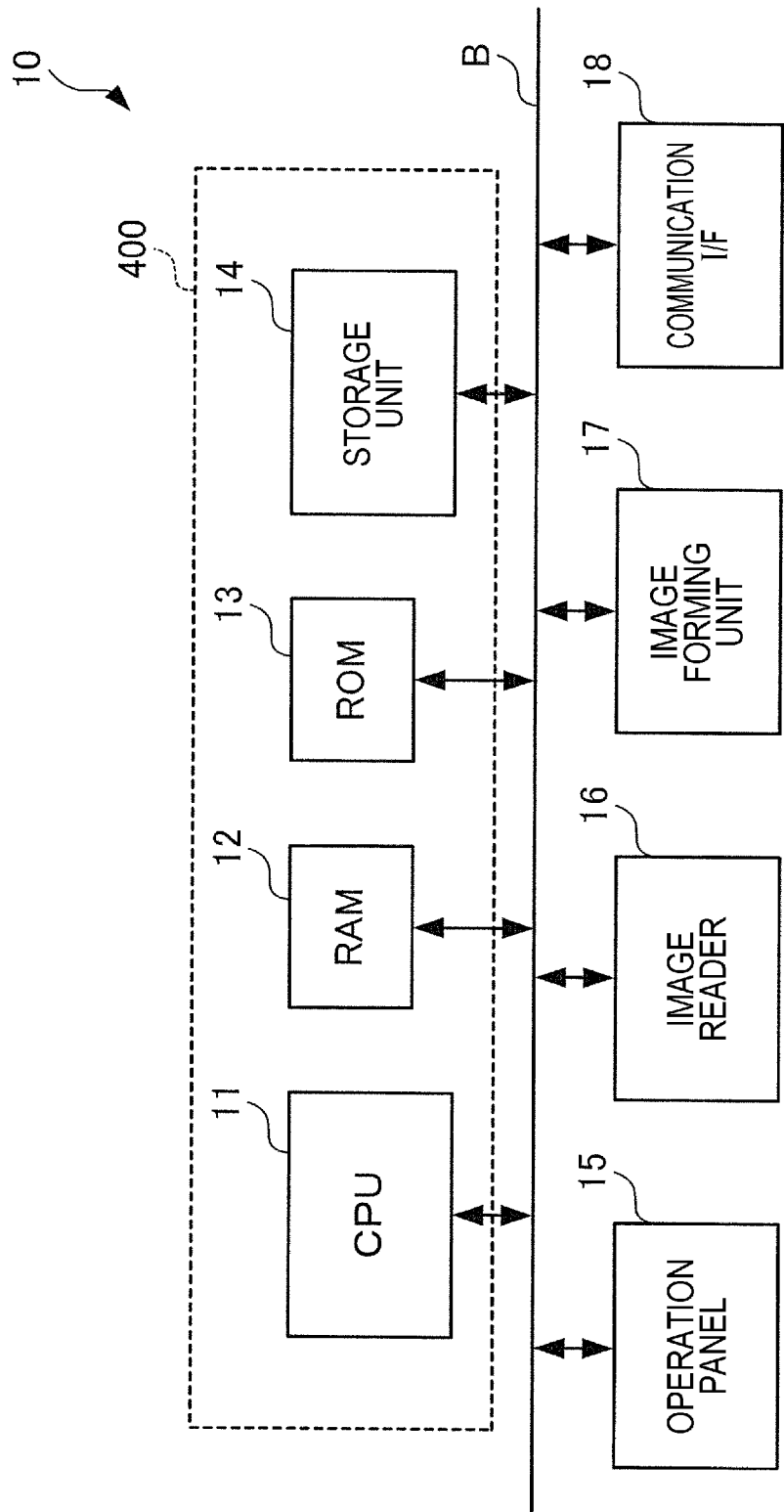
FIG. 1 illustrates a hardware configuration example of an image forming apparatus.

FIG. 1 illustrates a hardware configuration example of an image forming apparatus 10.

The image forming apparatus 10 is an example of an image forming system that forms an image onto a recording medium, such as a sheet, and outputs the recording medium as a printed medium. In addition to a printing function, the image forming apparatus 10 has other image processing functions, such as a scanning function and a facsimile function.

As shown in FIG. 1, the image forming apparatus 10 includes a central processing unit (CPU) 11, a random access memory (RAM) 12, a read-only memory (ROM) 13, a storage unit 14, an operation panel 15, an image reader 16, an image forming unit 17, and a communication interface (I/F) 18. These units exchange data with each other via a bus B.

The CPU 11 loads various types of programs stored in, for example, the ROM 13 into the RAM 12 and executes the programs, so as to realize various functions to be described later.

The RAM 12 is a memory used as a work memory of the CPU 11.

The ROM 13 is a memory that stores, for example, the various types of programs to be executed by the CPU 11.

The storage unit 14 stores, for example, image data (image information) read by the image reader 16 and image data to be used in image formation in the image forming unit 17. The storage unit 14 is, for example, a magnetic disk device, such as a hard disk drive (HDD), or a solid state drive (SSD).

The operation panel 15 displays various types of information and receives an operation input by a user. The operation panel 15 is, for example, a touchscreen.

The image reader 16 is an example of an image reading apparatus that reads an image recorded on a document. The image reader 16 is, for example, a scanner and may be of a charge-coupled device (CCD) type that uses a lens to reduce reflected light of light radiated onto a document from a light source and uses a CCD to receive the reflected light, or may be of a contact image sensor (CIS) type that uses a CIS to receive reflected light of light sequentially radiated onto a document from a light-emitting-diode (LED) light source. A detailed description of the image reader 16 will be provided later.

The image forming unit 17 forms the image read by the image reader 16 onto a recording medium. The image forming unit 17 is, for example, a printer and may be of an electrophotographic type that forms an image by transferring toner adhered to a photoconductor onto a recording medium, such as a sheet, or may be of an inkjet type that forms an image by ejecting ink onto a recording medium.

The communication I/F 18 exchanges various types of information with other devices via a network.

In this exemplary embodiment, the CPU 11, the RAM 12, the ROM 13, and the storage unit 14 constitute a system controller 400 that controls the entire image forming apparatus 10.

Operation of Image Forming Apparatus 10

A user may use such an image forming apparatus 10 to, for example, copy a document. Specifically, based on image data of a document read by the image reader 16, the image forming unit 17 may copy the document by forming the image onto a recording medium. Moreover, the user may transmit a print job to the image forming apparatus 10 from an external device (not shown), such as a personal computer (PC), via a network (not shown), such as a local area network (LAN) connected to the image forming apparatus 10, and the communication I/F 18, so that printing may be performed. Specifically, based on image data contained in the print job, the image forming unit 17 may perform printing by forming the image onto a recording medium. Furthermore, the user may perform a facsimile transmission-reception process. Specifically, the image data of the document read by the image reader 16 may be transmitted via the network and the communication I/F 18. Alternatively, the user may perform a document scanning process. Specifically, the image data of the document read by the image reader 16 may be saved in the storage unit 14 or may be saved in an external device via the network and the communication I/F 18.

Image Reader 16

Figure 2:
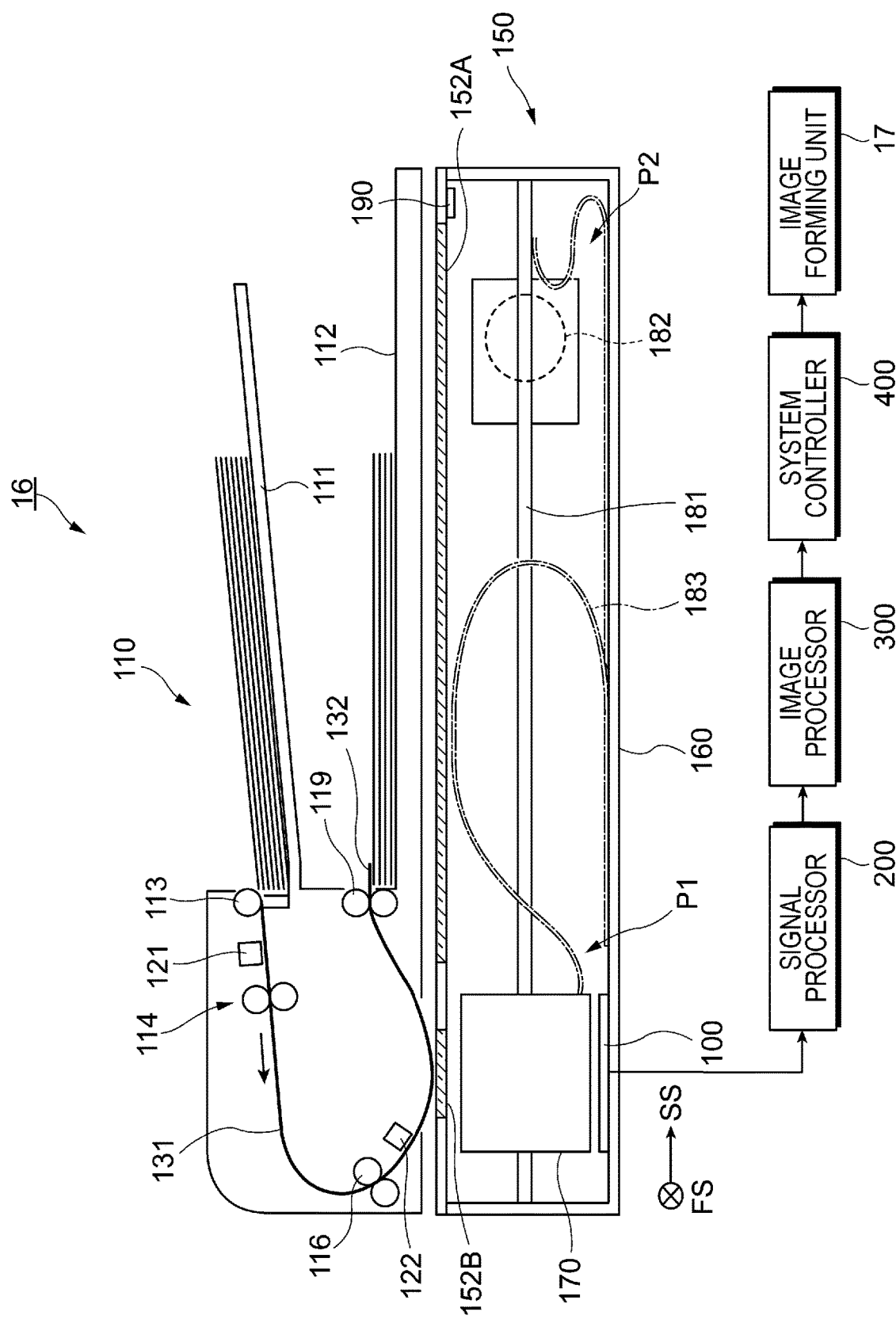
FIG. 2 illustrates a configuration example of an image reader that reads a document image in accordance with this exemplary embodiment.

FIG. 2 illustrates a configuration example of the image reader 16 that reads a document image in accordance with this exemplary embodiment. The image reader 16 is capable of reading an image of a secured document as well as an image of a transported document. This image reader 16 includes a reader 150 that generates image data by reading a document image and a document feeder 110 that separates documents one-by-one from a bundle of stacked documents and sequentially transports each document to the reader 150. The image reader 16 also includes a controller 100 that controls the entire image reader 16 and a signal processor 200 that processes read image data. Although the following components do not strictly constitute the image reader 16, an image processor 300 that performs image processing on an output from the signal processor 200, the aforementioned system controller 400 that controls the entire system including the image reader 16, and the aforementioned image forming unit 17 that forms an image onto a recording medium, such as a sheet, are also illustrated in FIG. 2.

The document feeder 110 includes a document load section 111 on which a document bundle constituted of multiple documents is loaded, and also includes an output load section 112 that is provided below the document load section 111 and on which documents having undergone reading are loaded. The document feeder 110 also includes a transport roller 113 that fetches and transports a document from the document load section 111. Furthermore, a separating mechanism 114 that uses a feed roller and a retardation roller to separate the documents one-by-one is provided downstream of the transport roller 113 in the document transport direction. A first transport path 131 along which a document is transported is provided with a registration roller 116 and an output roller 119 in that order from the upstream side in the document transport direction. Moreover, the document feeder 110 includes a document sensor 121 that detects a document, and also includes a scan sensor 122.

The registration roller 116 feeds a document while performing a registration (displacement) adjustment process relative to the reader 150, to be described later. A second transport path 132 for guiding a document to the output load section 112 is provided downstream of the reader 150 in the document transport direction. The second transport path 132 is provided with the output roller 119. The transport roller 113, the separating mechanism 114, the registration roller 116, and the output roller 119 function as a transport unit that transports a document.

The transport roller 113, the separating mechanism 114, the registration roller 116, and the output roller 119 are driven in conjunction with one another when a power source, such as a driving motor (not shown), is actuated. Specifically, the document feeder 110 according to this exemplary embodiment is a so-called clutchless device in which the transport roller 113, the separating mechanism 114, the registration roller 116, and the output roller 119 all rotate when the power source is actuated and all stop when the power source is stopped. In other words, it is not possible to selectively rotate any of the above components and selectively stop any of the above components when the power source is actuated.

The document sensor 121 is provided between the transport roller 113 and the separating mechanism 114 in the document feeder 110. In other words, the document sensor 121 is disposed at the entrance of the first transport path 131. Accordingly, the document sensor 121 functions as a detector that detects whether or not there is a document bundle prior to being transported.

The scan sensor 122 is provided in front of a document reading position of the reader 150 in the document feeder 110. Thus, when a document is transported along the first transport path 131 by the transport roller 113, the separating mechanism 114, and the registration roller 116, the scan sensor 122 detects that the document has reached the reader 150. Accordingly, the scan sensor 122 functions as a sensor that detects a document transported to the position of the reader 150.

The reader 150 supports the aforementioned document feeder 110 in an openable-closable manner and also supports this document feeder 110 by using a device frame 160. Moreover, the reader 150 reads an image of a document transported by the document feeder 110. The reader 150 includes the device frame 160 that constitutes a housing, a first platen glass member 152A on which a document is placed and through which light radiated onto the document from a light emitter (not shown) and light reflected from the document are transmitted, and a second platen glass member 152B having a light opening used for reading a document transported by the document feeder 110. The second platen glass member 152B is formed of, for example, a transparent glass plate having a long plate-like structure.

The light emitter has a light-emitting-element array having multiple light emitting elements (such as light-emitting diodes (LEDs)) arranged in a first scanning direction FS, and radiates light onto a document. Moreover, the light emitter has a light-receiving-element array (such as a CCD image sensor) that receives light reflected from the document.

In this exemplary embodiment, the light-receiving-element array includes three arrays of CCDs corresponding to red (R), green (G), and blue (B) colors and is capable of measuring an image recorded on a document based on RGB colors. In other words, the light-receiving-element array is a three-line-color CCD array. The light received by the light-receiving-element array undergoes photoelectric conversion to become an electric charge, and this electric charge is detected and becomes image data as an electric signal. Because the light-receiving-element array includes the three-color CCDs corresponding to the red (R), green (G), and blue (B) colors, an R signal, a G signal, and a B signal as image data respectively corresponding to the three colors are generated.

The reader 150 further includes a reading unit 170 disposed within the device frame 160, a guide shaft 181 that guides the reading unit 170 within the device frame 160 in a second scanning direction SS and in a direction opposite thereto, a driving motor 182 that moves the reading unit 170 along the guide shaft 181, and a white reference plate 190 that performs white color proofing. The reader 150 also includes a cable unit 183 having a first end attached to the device frame 160 and a second end attached to the reading unit 170. The cable unit 183 exchanges electric power and signals with the reading unit 170. In this exemplary embodiment, the guide shaft 181 and the driving motor 182 may be regarded as a moving unit that moves the light emitter (not shown) in the second scanning direction SS. In this case, the moving unit guides the light emitter by using the guide shaft 181 functioning as a guide member, so as to move the light emitter along the first platen glass member 152A.

The reading unit 170 is normally positioned at a reference position P1 below the second platen glass member 152B. When a document from which an image is to be read is placed in a stationary state on the first platen glass member 152A, the reading unit 170 moves in the second scanning direction SS in accordance with a document reading process to reach a terminal position P2 at the downstream-most side in the second scanning direction SS, and subsequently returns to the reference position P1. When a document transported by the document feeder 110 is to be read, the reading unit 170 reads the document while remaining stationary at the reference position P1.

In the following description, the direction extending from the front side toward the rear side of each drawing will be referred to as "first scanning direction FS".

Control of Document Feeder 110

When a document reading process is to be performed by using the document feeder 110, the user places a first document bundle corresponding to a first job for the document reading process on the document load section 111. Then, the document feeder 110 sequentially pulls the documents in the first document bundle into the document feeder 110 so that images are read therefrom. However, the user may sometimes place a second document bundle corresponding to a second job as a subsequent job on the document load section 111 before all the documents in the first document bundle are output onto the output load section 112. In this case, if the document load section 111 has a clutch mechanism, the transport roller 113 and the separating mechanism 114 are stopped while the documents are transported by the registration roller 116 and the output roller 119, so that the documents in the second document bundle may be prevented from being pulled into the document feeder 110. In contrast, since the document feeder 110 according to this exemplary embodiment is a clutchless device, as mentioned above, it is not possible to stop the transport roller 113 and the separating mechanism 114, thus causing the documents in the second document bundle to be pulled into the document feeder 110.

Figure 3:
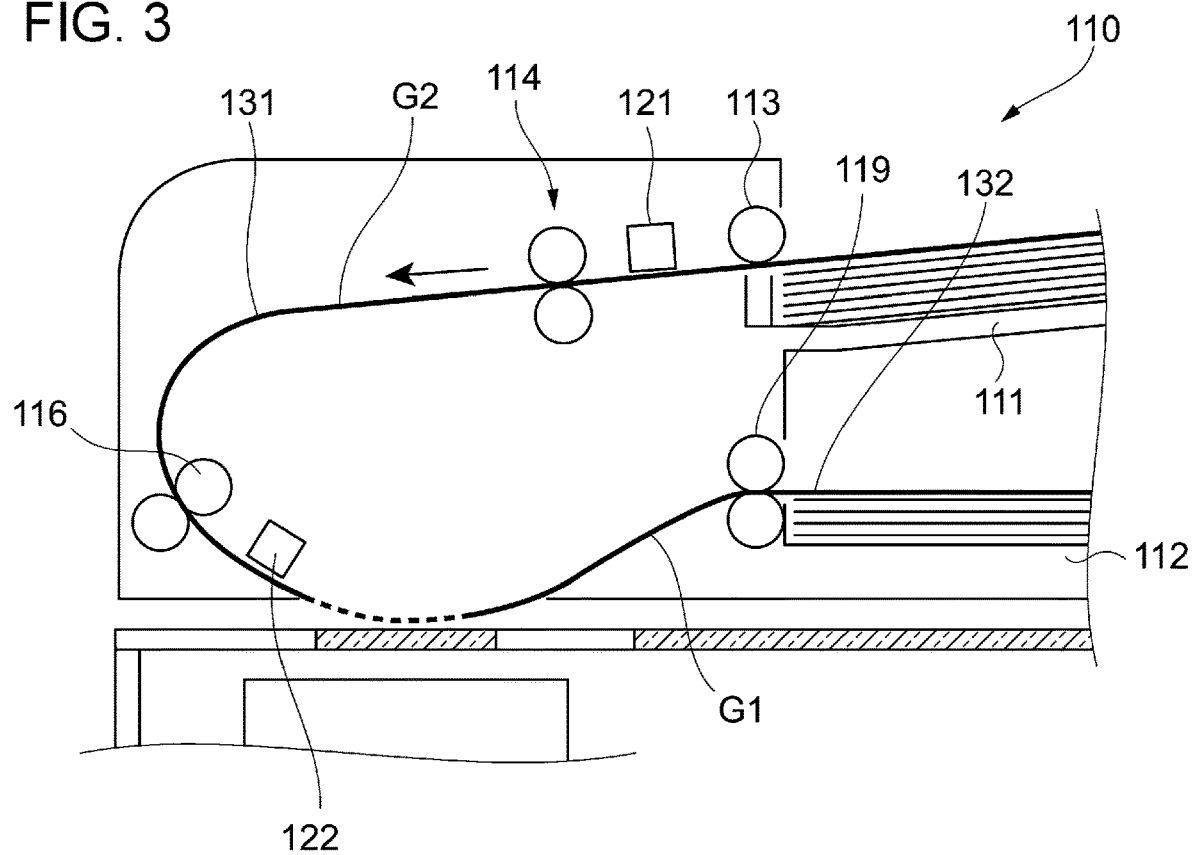
FIG. 3 illustrates a state where a document in a second document bundle is pulled into a document feeder.

FIG. 3 illustrates a state where a document in the second document bundle is pulled into the document feeder 110.

A document G1 shown in FIG. 3 is the last document in the first document bundle corresponding to the first job. FIG. 3 illustrates a state where the document G1 is being read by the reader 150 and a document G2 as the first document in the second document bundle corresponding to the second job is being pulled into the document feeder 110. In this example, the document G2 is pulled in to the position of the scan sensor 122 in the first transport path 131.

When the second job commences in this state, the document G2 may undergo an improper reading process due to a displaced reading position, or may become jammed. Furthermore, because the document G1 corresponding to the first job is located within the document feeder 110, the document G1 may also become jammed. In this case, the user has to place the document bundle corresponding to the first job on the document load section 111 again so that the reading process is performed again. In other words, regardless of the fact that the last document G1 of the documents in the document bundle corresponding to the first job has been transported, the reading process has to be performed again from the beginning, resulting in a large load on the user.

In this exemplary embodiment, the controller 100 performs first control and second control, to be described below, on the document feeder 110, so as to suppress this problem.

First Control

Figure 4:
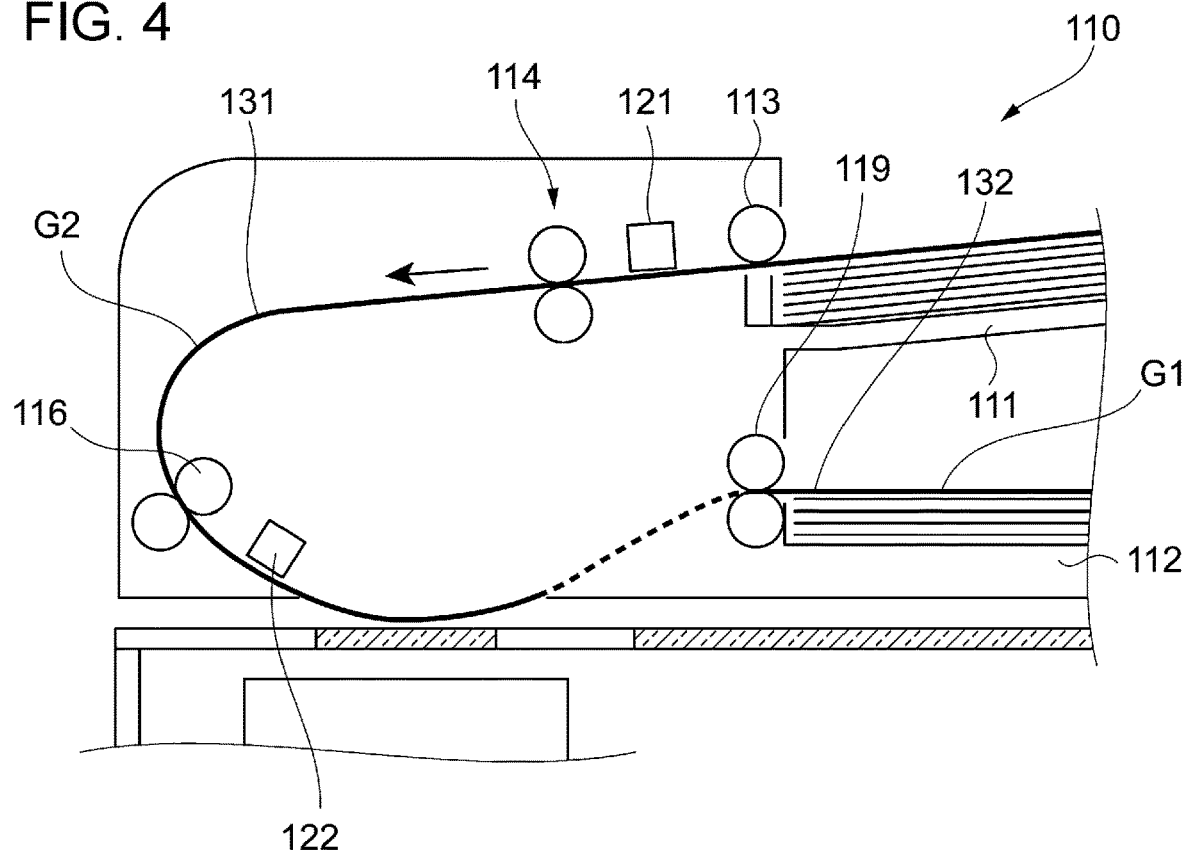
FIG. 4 illustrates first control performed on the document feeder by a controller.

FIG. 4 illustrates first control performed on the document feeder 110 by the controller 100.

In this exemplary embodiment, while the document G1 in the first document bundle corresponding to the first job is being transported, if the document sensor 121 detects that the document G2 in the second document bundle corresponding to the second job as a subsequent job is loaded, the controller 100 actuates the transport unit until all the documents G1 in the first document bundle are output.

Specifically, as shown in FIG. 4, even in a case where the document G2 corresponding to the second job as a subsequent job is pulled in, the transport roller 113, the separating mechanism 114, the registration roller 116, and the output roller 119 constituting the transport unit are actuated without stopping until the document G1 corresponding to the first job as a preceding job is output onto the output load section 112.

In fact, since the document G1 is the last document in the first document bundle, the first document bundle is no longer detected after the document G1 passes through the document sensor 121. Specifically, the document sensor 121 detects that a state where there is a document bundle has changed to a state where there is no document bundle, and the detection signal changes from ON to OFF. However, when the user places the second document bundle on the document load section 111, the document sensor 121 detects the second document bundle. Specifically, the document sensor 121 detects again that there is a document bundle, and the detection signal changes from OFF to ON. In other words, if the document G1 is being transported when the detection signal changes from ON to OFF and then changes again to ON, the document G2 is pulled into the document feeder 110.

The determination of whether or not the document G1 is being transported may be performed by the scan sensor 122 based on the time from when the trailing edge of the document G1 is detected. In other words, when the document G1 is read by the reader 150, the transport speed of the document G1 is constant. Moreover, the distance from the scan sensor 122 to the output load section 112 is fixed. Thus, the determination may be performed based on a time T1 from when the trailing edge of the document G1 is detected. In detail, it may be determined that the document G1 is being transported if the predetermined time T1 has not elapsed from when the trailing edge of the document G1 is detected. In contrast, if the predetermined time T1 has elapsed, it may be determined that the document G1 has been output onto the output load section 112. The trailing edge of the document G1 may be detected based on whether the detection signal of the scan sensor 122 changes from ON to OFF when the trailing edge of the document G1 passes therethrough.

Then, the controller 100 performs the first control to temporarily stop the transporting of documents in a state where the document G1 is output onto the output load section 112. In fact, the document transport unit is stopped at the point where the predetermined time T1 has elapsed from when the trailing edge of the document G1 is detected by the scan sensor 122. Subsequently, the controller 100 performs second control, to be described below, in accordance with the position of the document G2 when the second job commences.

Second Control

In this exemplary embodiment, when all the documents G1 in the first document bundle are output, the controller 100 changes the operation of the transport unit performed on the second job in accordance with the position of the document G2 pulled into the document feeder 110 from the second document bundle.

This will be described below in detail.

First, the position of the document G2 when all the documents G1 are output will be described.

Figure 5:
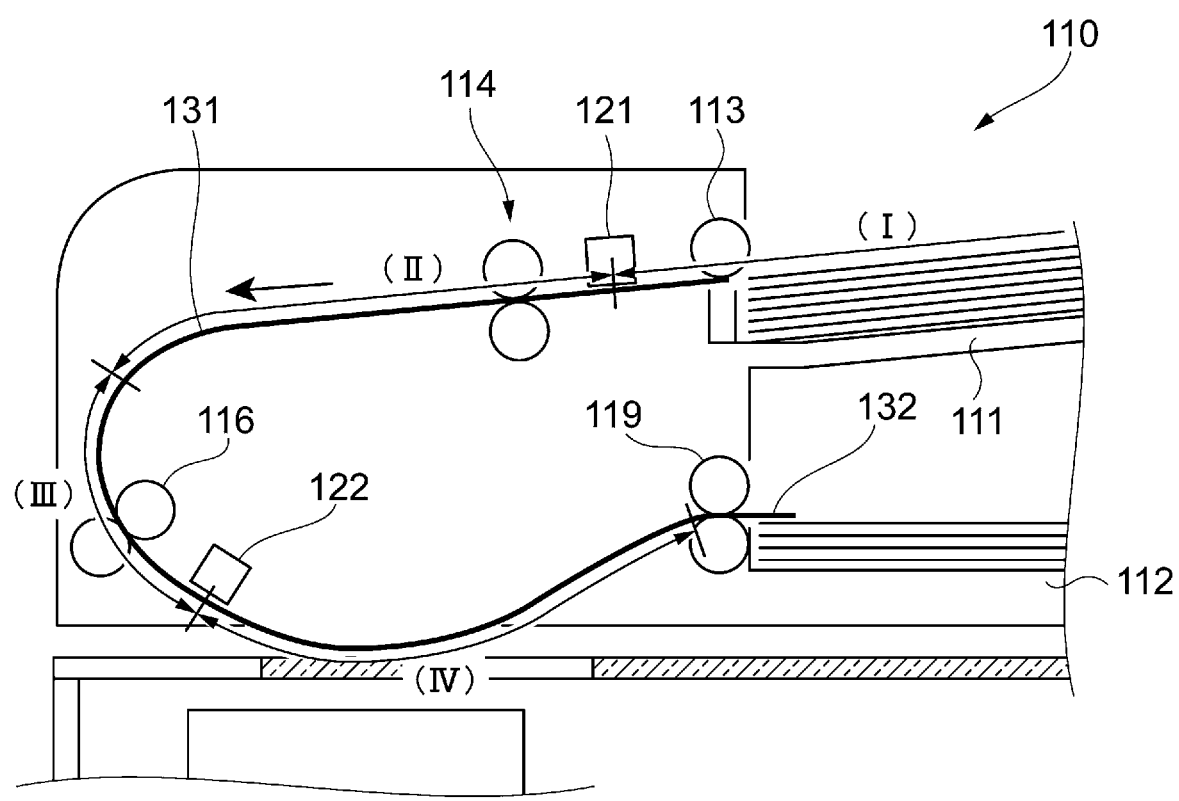
FIG. 5 illustrates the position of a document when another document is output onto an output load section.
Figure 8A:
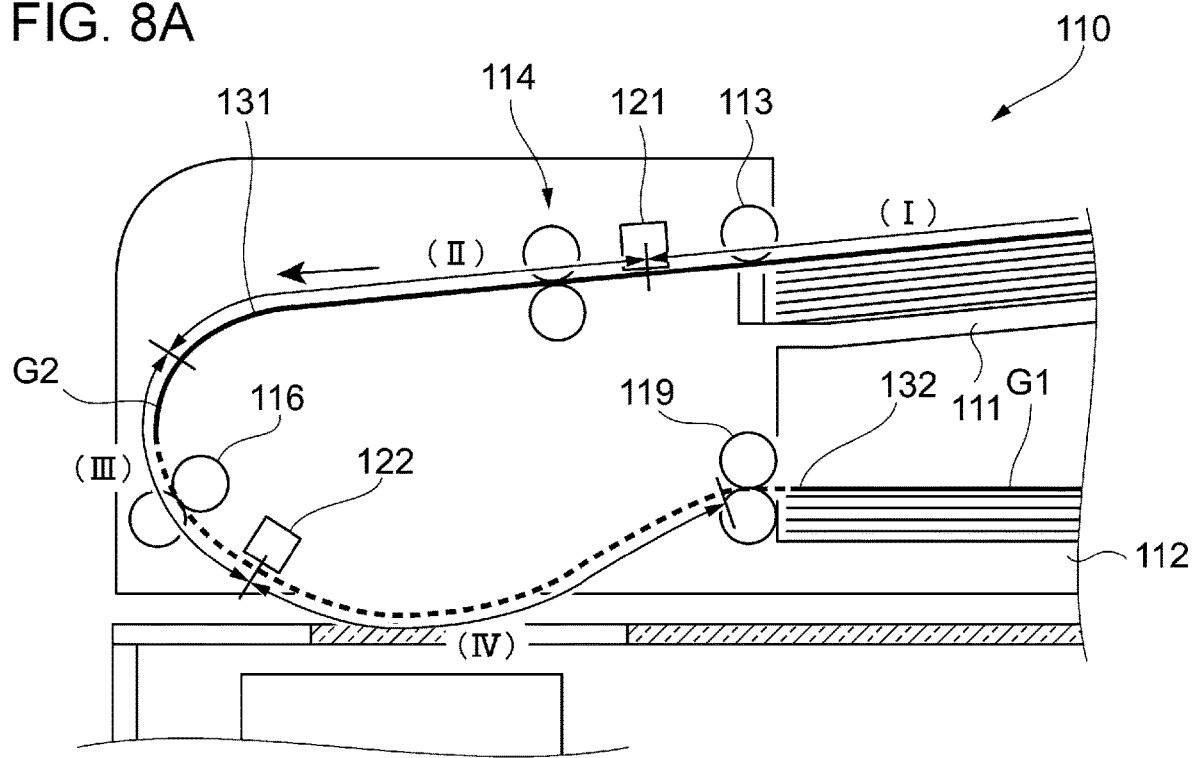
FIGS. 8A and 8B, together with FIG. 6B, illustrate the second control performed in this exemplary embodiment.
Figure 8B:
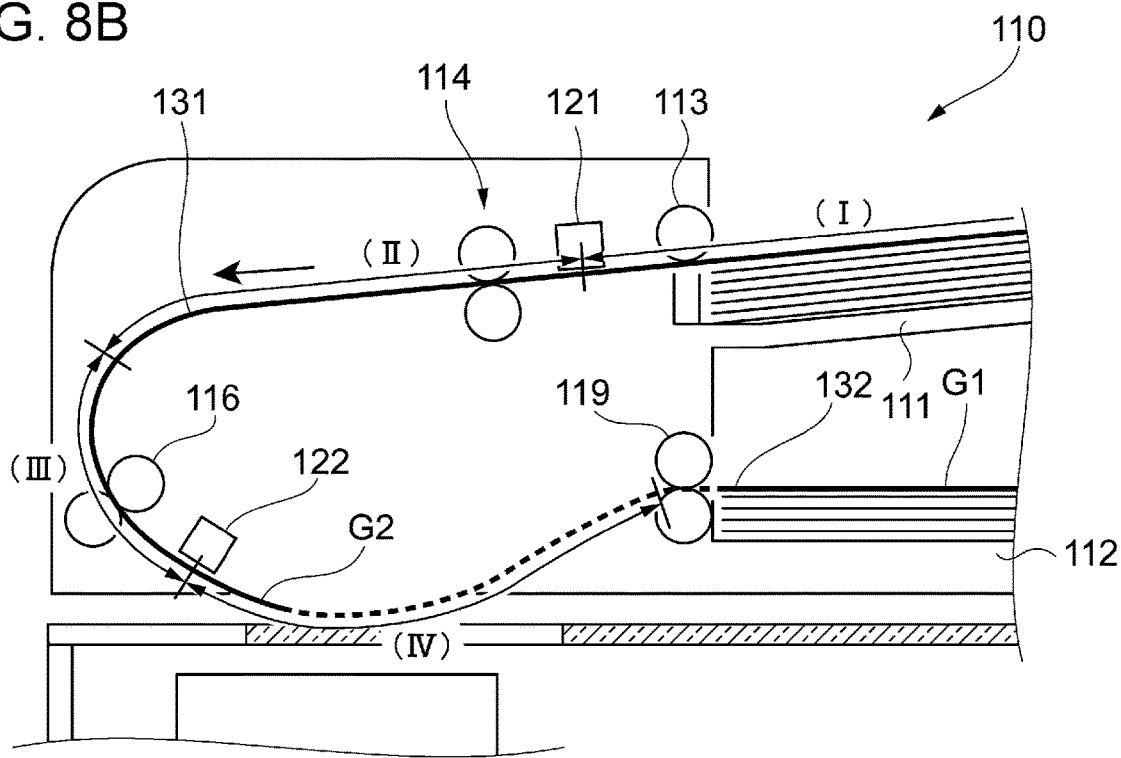

FIG. 5 illustrates the position of the document G2 when the document G1 is output onto the output load section 112.

First, when all the documents G1 are output, it is conceivable that the document G2 is located at a position (I) shown in FIG. 5. The position (I) shown in FIG. 5 is a positional range along the first transport path 131 from the document load section 111 to the document sensor 121. At this position, the document G2 is not pulled into the document feeder 110. In this case, for example, the document bundle corresponding to the second job is not yet placed on the document load section 111 when all the documents G1 are output, and the document bundle is placed on the document load section 111 after all the documents G1 are output. The document G2 in this case is not pulled into the document feeder 110, and the document G2 is located at the position (I) shown in FIG. 5.

Subsequently, when all the documents G1 are output, it is conceivable that the document G2 is located at a position (II) shown in FIG. 5. The position (II) shown in FIG. 5 is a positional range along the first transport path 131 from the document sensor 121 to a point between the document sensor 121 and the scan sensor 122. Such a case occurs when, for example, the user places the second document bundle on the document load section 111 immediately before all the documents G1 are output. In this case, the document G2 is pulled into the document feeder 110 but is not pulled therein by a large amount.

Furthermore, when all the documents G1 are output, it is conceivable that the document G2 is located at a position (III) shown in FIG. 5. The position (III) shown in FIG. 5 is a positional range along the first transport path 131 from the terminal end of the position (II) to the scan sensor 122. Such a case occurs when, for example, the user places the second document bundle on the document load section 111 shortly after the document G1 is pulled into the document feeder 110. In this case, the document G2 is pulled into the document feeder 110 by a large amount.

When all the documents G1 are output, it is conceivable that the document G2 is located at a position (IV) shown in FIG. 5. The position (IV) shown in FIG. 5 is a positional range along the first transport path 131 from the scan sensor 122 to the output load section 112. Such a case occurs when, for example, the user places the second document bundle on the document load section 111 immediately after the document G1 is pulled into the document feeder 110. In this case, the document G2 is pulled into the document feeder 110 by a large amount and has passed the position of the scan sensor 122.

The position (II) in FIG. 5 is where the document G2 pulled into the document feeder 110 and transported toward the reader 150 may be accelerated to a predetermined speed by the transport unit before reaching the reading position of the reader 150. In this case, the reader 150 is capable of performing the reading process. In other words, the position (II) shown in FIG. 5 is where the second job is executable. In contrast, the position (III) shown in FIG. 5 is where the document G2 pulled into the document feeder 110 is not capable of being increased to the predetermined speed by the transport unit before reaching the reading position of the reader 150. In other words, the position (III) shown in FIG. 5 is where it is not possible to continue with the second job since the reading process is not properly executable. Likewise, the position (IV) shown in FIG. 5 is also where it is not possible to continue with the second job since the reading process is not properly executable by the reader 150.

The determination of which of the positions (I) to (IV) the document G2 is located at may be performed by using the document sensor 121 and the scan sensor 122.

Specifically, if the document sensor 121 is not detecting a document bundle when the document G1 is output, it may be determined that the document G2 is located at the position (I). If the document sensor 121 is detecting a document bundle, it may be determined that the document G2 is located at any of the positions (II) to (IV).

In this case, if the scan sensor 122 is detecting the document G2, it may be determined that the document G2 is located at the position (IV).

If the scan sensor 122 is not detecting the document G2, the document G2 is located at either the position (II) or the position (III). Then, when the scan sensor 122 detects the document G2 within a predetermined time T2 after the second job commences, it may be determined that the document G2 is located at the position (III). When the scan sensor 122 detects the document G2 beyond the predetermined time T2, it may be determined that the document G2 is located at the position (II). In other words, because the position (III) is closer to the scan sensor 122 and the position (II) is farther from the scan sensor 122, there is a difference in the time it takes for the document G2 to reach the scan sensor 122. The controller 100 utilizes this time difference to determine whether the document G2 is located at the position (II) or the position (III).

FIGS. 6A and 6B illustrate the second control performed on the document feeder 110 by the controller 100.

FIG. 6A illustrates the contents of control performed in the related art when the document G2 is located at the positions (I) to (IV). FIG. 6B illustrates the contents of the second control performed in this exemplary embodiment.

As shown in FIG. 6A, in the related art, pre-feeding is performed at the positions (I) to (III). Pre-feeding involves preliminarily pulling a document into the document feeder 110. In actuality, the document is pulled in to a position immediately before the boundary between the position (II) and the position (III) along the first transport path 131. Accordingly, the transport distance of the document is reduced and the read rate is improved, as compared with a case where the document is pulled in from the document load section 111 without undergoing pre-feeding. After the pre-feeding, the reader 150 reads the document, and the transport unit subsequently has to transport the document to output the document onto the output load section 112. This may be referred to as "feeding" hereinafter.

As shown in FIG. 6A, if the document G2 is located at the position (I), the document G2 undergoes pre-feeding so that the position thereof after the pre-feeding becomes the position (II). In this case, when the document G1 is output, the document G2 is sometimes not pulled into the document feeder 110, so that the reading process is properly completed. In other words, the second job is properly executable.

If the document G2 is located at the position (II), the document G2 undergoes pre-feeding so that the position thereof after the pre-feeding becomes the position (III) or (IV). In this case, if the pre-fed document G2 is located at the position (III), the reading position is displaced such that the reading process is not properly performed. If the pre-fed document G2 is located at the position (IV), the document G2 is detected by the scan sensor 122 and is determined as being jammed when the second job commences.

Furthermore, if the document G2 is located at the position (III), the document G2 undergoes pre-feeding so that the position thereof after the pre-feeding becomes the position (IV). In this case, the document G2 is detected by the scan sensor 122 and is determined as being jammed when the second job commences.

If the document G2 is located at the position (IV), the document G2 is detected by the scan sensor 122 and is determined as being jammed when the first job ends. In this case, since the document jam is confirmed when the first job ends, the pre-feeding for the second job is not performed.

In contrast, in this exemplary embodiment, the control shown in FIG. 6B is performed. In this exemplary embodiment, depending on which of the positions (I) to (IV) the document G2 is located at, the controller 100 performs the second control to be described below in addition to the first control described with reference to FIG. 4.

FIGS. 7A and 7B and FIGS. 8A and 8B, together with FIG. 6B, illustrate the second control performed in this exemplary embodiment.

In a case where the document G2 is located at the position (I) (i.e., the case in FIG. 7A), the document G2 undergoes pre-feeding so that the position thereof after the pre-feeding becomes the position immediately in front of the boundary between the position (II) and the position (III). In this case, the pre-feeding is performed over a fixed length. In other words, as a result of the pre-feeding, the document G2 moves by a predetermined distance from the position where the document G2 is placed to the position immediately in front of the boundary between the position (II) and the position (III). In this case, the document G2 is sometimes not pulled into the document feeder 110, so that the reading process is properly completed.

In a case where the document G2 is located at the position (II) (i.e., the case in FIG. 7B), the document G2 undergoes pre-feeding so that the position thereof after the pre-feeding becomes the position immediately in front of the boundary between the position (II) and the position (III). In this case, the pre-feeding is performed over a variable length. In other words, in accordance with the pre-feeding, the document G2 moves by the distance from the pull-in position to the position immediately in front of the boundary between the position (II) and the position (III). In this case, the distance by which the document G2 moves changes in accordance with the pull-in position of the document G2. In other words, this is different from the case in FIG. 6A. The pre-feeding distance by which the pre-feeding is performed is shorter than the fixed length mentioned above. As mentioned above, at the position (II), the document G2 may be accelerated to a predetermined speed by the transport unit before reaching the reading position of the reader 150, and may be read by the reader 150. In other words, when a document pulled into the document feeder 110 is located where the document may reach the predetermined speed before being transported to the reader 150, the controller 100 continues with the second job. If the document G2 is located at the position (II), the controller 100 performs pre-feeding over a variable length and controls the transport unit to transport the document. Accordingly, unlike in the related art, the second job is properly executable.

In a case where the document G2 is located at the position (III) (i.e., the case in FIG. 8A), pre-feeding is not performed. In other words, this is different from the case in FIG. 6A. In this case, since the document G2 does not undergo pre-feeding, the position thereof remains unchanged at the position (III). The document G2 in this case is determined as being jammed when the first job ends. In other words, when a document is located where the document is not able to reach a predetermined speed before being transported to the reader 150, the controller 100 discontinues the second job. Then, the controller 100 issues a warning indicating that there is a document jam when the first job ends. In detail, a notification is provided to the user by displaying a message on the operation panel 15 indicating that a document jam has occurred. Such a notification indicating the occurrence of a document jam may alternatively be provided to the user by outputting a warning sound or outputting an audio guidance message.

In a case where the document G2 is located at the position (IV) (i.e., the case in FIG. 8B), the document G2 is detected by the scan sensor 122 and is determined as being jammed when the first job ends. In other words, when a document is pulled in to a position where it is detected by the scan sensor 122, the controller 100 discontinues the second job. Then, the controller 100 issues a warning indicating that there is a document jam when the first job ends. In this case, the document G2 is detected by the scan sensor 122 at the point when the first job ends.

Accordingly, in the second control, if the document sensor 121 detects that the second document bundle corresponding to the second job as a subsequent job is loaded while the document G1 in the first document bundle corresponding to the first job is being transported, the pre-feeding operation for preliminarily pulling the document G2 into the reader 150 is changed in accordance with the position at which the document G2 in the second document bundle is pulled into the reader 150.

In detail, if the document G2 pulled into the reader 150 is located where the document G2 is able to reach the predetermined speed (i.e., if the document G2 is located at the position (II)) when all the documents G1 in the first document bundle are output in accordance with the first control, the controller 100 performs pre-feeding and continues with the second job. In this case, the controller 100 performs the pre-feeding over a shorter distance than in the normal operation (i.e., when the document G2 is located at the position (I)). As a result, the reading process may be properly performed for the second job.

If the document G2 is located where the document G2 is not able to reach the predetermined speed when all the documents G1 in the first document bundle are output (i.e., if the document G2 is located at the position (III)), the controller 100 does not perform pre-feeding and discontinues the second job.

Furthermore, if the document G2 is pulled in to a position where it is detected by the scan sensor 122 when all the documents G1 in the first document bundle are output (i.e., if the document G2 is located at the position (IV)), the controller 100 does not perform pre-feeding and discontinues the second job.

The matter described above may be regarded that the controller 100 changes the pre-feeding distance in accordance with the position of the document G2 pulled into the reader 150 when all the documents G1 in the first document bundle are output in accordance with the first control.

In detail, the controller 100 performs pre-feeding over a normal distance when the document G2 in the second document bundle is not pulled into the reader 150 (i.e., when the document G2 is located at the position (I)), and reduces the pre-feeding distance in accordance with the pull-in distance when the document G2 in the second document bundle is pulled into the reader 150 (i.e., when the document G2 is located at the position (II), (III), or (IV)). In this case, if the pull-in distance is greater than or equal to a predetermined distance (i.e., if the document G2 is located at the position (III) or (IV)), the controller 100 sets the pre-feeding distance to zero. In other words, pre-feeding is not performed.

Functional Configuration of Controller 100

Next, the functional configuration of the controller 100 according to this exemplary embodiment will be described.

FIG. 9 is a block diagram illustrating a functional configuration example of the controller 100 according to this exemplary embodiment.

In FIG. 9, some of the various functions of the controller 100 that are related to this exemplary embodiment are selectively illustrated.

As shown in FIG. 9, the controller 100 includes a detection-signal acquiring unit 101 that acquires a detection signal, a time measuring unit 102 that performs a time measuring process, a transport controller 103 that controls a transport unit H, and a storage unit 104 that stores predetermined contents.

The detection-signal acquiring unit 101 acquires detection signals acquired by the document sensor 121 and the scan sensor 122. Based on the detection signal from the document sensor 121, the controller 100 may ascertain whether or not there is a document on the document load section 111. Based on the detection signal from the scan sensor 122, the controller 100 may ascertain the position of a document passing through the scan sensor 122.

The time measuring unit 102 performs a time measuring process based on the detection signals acquired from the document sensor 121 and the scan sensor 122. Based on the time measured by the time measuring unit 102, the controller 100 may ascertain which of the positions (I) to (IV) the document G2 is located at along the first transport path 131, as mentioned above.

The transport controller 103 controls the power source, such as a driving motor, for actuating the transport roller 113, the separating mechanism 114, the registration roller 116, and the output roller 119 constituting the transport unit H. Accordingly, the transport controller 103 changes the operation modes of these components to perform the first control and the second control described above.

The storage unit 104 stores, for example, the time used for determining whether the document G1 has been output or the time used for determining which of the positions (I) to (IV) the document G2 is located at along the first transport path 131. In other words, for example, the storage unit 104 stores the time T1 and the time T2 described above.

Operation of Document Feeder 110

Next, the operation of the document feeder 110 including the operation of the controller 100 will be described.

Figure 10:
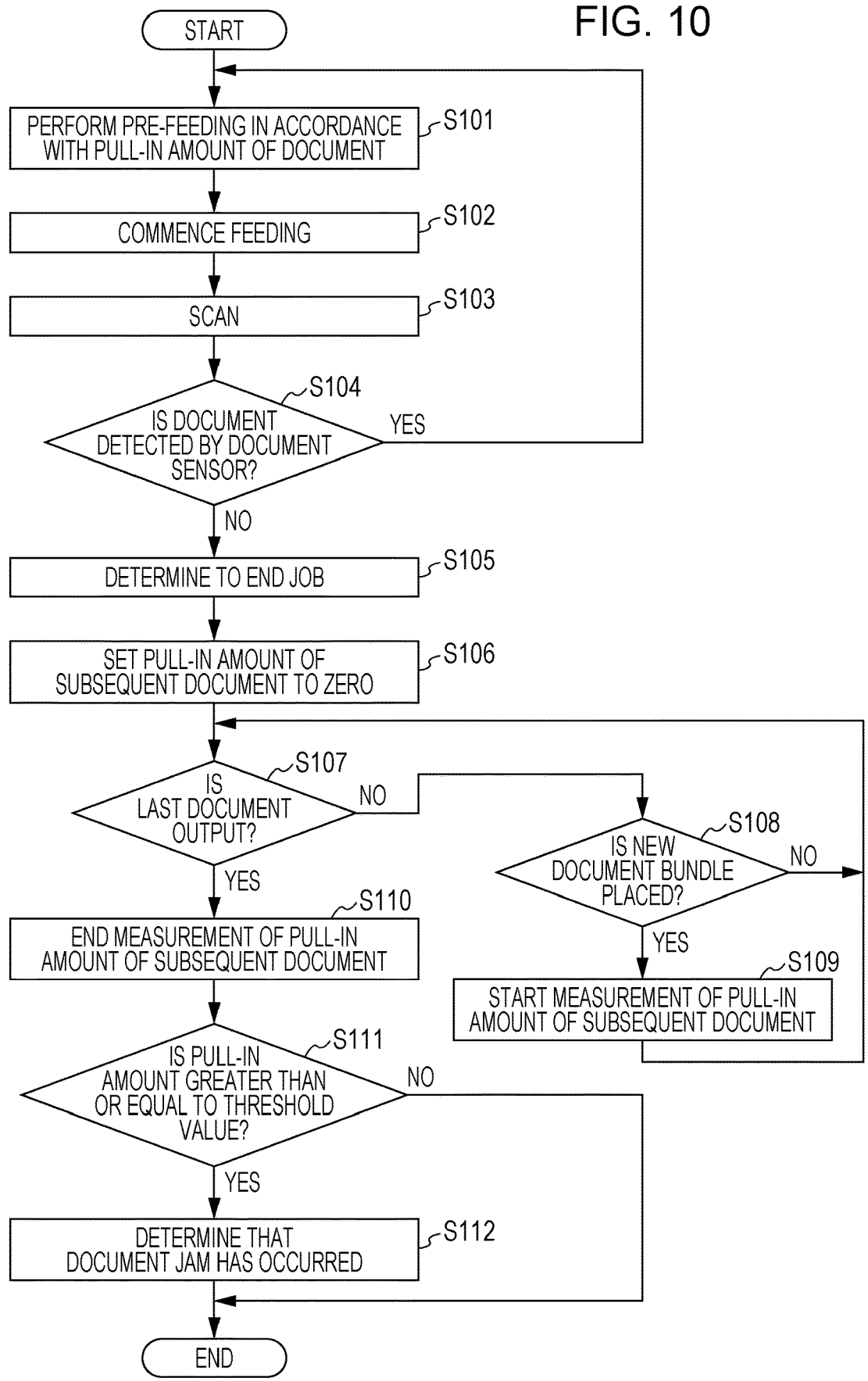
FIG. 10 is a flowchart illustrating the operation of the document feeder.

FIG. 10 is a flowchart illustrating the operation of the document feeder 110.

First, in step S101, the transport controller 103 pre-feeds a document. In this case, the transport controller 103 changes the pre-feeding distance of the document G2 in accordance with the pull-in amount of the document. This corresponds to a case where a document is located at the position (I) or (II) described above and where pre-feeding is performed.

Then, the transport controller 103 commences feeding of the document G2 in step S102, and the reader 150 performs a reading (scanning) process in step S103.

In step S104, the detection-signal acquiring unit 101 determines whether or not a document is detected by the document sensor 121. In other words, the detection-signal acquiring unit 101 determines whether or not there is any document still remaining on the document load section 111.

If the result indicates that a document is detected (Yes in step S104), the process returns to step S101 to transport the subsequent document.

In contrast, if no document is detected (No in step S104), it is clear that the document corresponding to this job is the last document. Therefore, the transport controller 103 determines to end this job in step S105.

In step S106, the transport controller 103 resets the pull-in amount of the subsequent document to zero.

Then, in step S107, the transport controller 103 determines whether or not the last document corresponding to this job has been output onto the output load section 112. The determination of whether or not the document has been output onto the output load section 112 may be performed based on the time from when the trailing edge of the document is detected, as described above. Specifically, if the predetermined time T1 has not elapsed from when the trailing edge of the document is detected, it may be determined that the document is being transported. In contrast, if the predetermined time T1 has elapsed, it may be determined that the document has been output onto the output load section 112. This time is measured by the time measuring unit 102 and is acquired by the transport controller 103.

If the result indicates that the last document corresponding to this job has not been output onto the output load section 112 (No in step S107), the detection-signal acquiring unit 101 determines whether or not a document is detected by the document sensor 121. In other words, in step S108, the detection-signal acquiring unit 101 determines whether or not a new document bundle has been placed on the document load section 111.

If a document is not detected and a new document bundle has not been placed (No in step S108), the process returns to step S107.

In contrast, if a document is detected and a new document bundle has been placed (Yes in step S108), the time measuring unit 102 starts to measure the pull-in amount of a subsequent document in step S109. The process then returns to step S107.

In contrast, if the last document has been output onto the output load section 112 (Yes in step S107), the time measuring unit 102 ends the measurement of the pull-in amount of the subsequent document in step S110.

Then, the transport controller 103 determines whether or not the measured pull-in amount is greater than or equal to a predetermined threshold value in step S111.

If the result indicates that the measured pull-in amount is greater than or equal to the predetermined threshold value (Yes in step S111), the transport controller 103 determines that a document jam has occurred and issues a warning in step S112. This corresponds to a case where a document is located at the position (III) or (IV) described above.

In contrast, if the measured pull-in amount is not greater than or equal to the predetermined threshold value (No in step S111), the transport controller 103 performs the above-described control from step S101 and onward on a new document bundle. This corresponds to a case where a document is located at the position (I) or (II) described above.

As described above in detail, in this exemplary embodiment, the first control involves actuating the transport unit until all documents in the first document bundle corresponding to the first job are output if the document sensor 121 detects that the document G2 in the second document bundle corresponding to the second job as a subsequent job is loaded while the document G1 in the first document bundle is being transported. Accordingly, even if the document G2 in the document bundle corresponding to the second job as a subsequent job is pulled into the document feeder 110, at least the document G1 in the document bundle corresponding to the first job as a preceding job may be properly read. As a result, at least the reading process for the first job may be properly completed. Therefore, at least the document corresponding to the first job as a preceding job does not have to be re-read, thereby reducing the load on the user.

Furthermore, in the second control according to this exemplary embodiment, the controller 100 changes the operation of the transport unit performed on the second job in accordance with the position of the document G2 pulled into the document feeder 110 from the second document bundle when all the documents G1 in the first document bundle are output. Specifically, the operation of the transport unit is changed depending on which of the positions (I) to (IV) the document G2 is located at. In this case, if the document G2 is located at the position (III) or (IV), it is determined that a document jam has occurred. If the document G2 is located at the position (II), the pre-feeding distance may be changed so that displacement of the reading position for the document G2 may be suppressed. As a result, the reading process may be properly performed not only for the first job but also for the second job.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading apparatus comprising:
   a transport unit that transports a document;
   a reader that reads the transported document;
   a detector that detects whether or not a document bundle prior to being transported is present; and
   a controller wherein, while a document in a first document bundle corresponding to a first job is being transported, if the detector detects that a second document bundle corresponding to a second job as a subsequent job is loaded, the controller changes pre-feeding operation for preliminarily pulling a document in the second document bundle into the image reading apparatus in accordance with a pull-in position of the document in the image reading apparatus.

2. The image reading apparatus according to claim 1, wherein if the second document bundle corresponding to the second job is detected as being loaded, the controller actuates the transport unit until all documents in the first document bundle are output.

3. The image reading apparatus according to claim 2, wherein if the document pulled into the image reading apparatus is located where the document is able to reach a predetermined speed when all the documents in the first document bundle are output, the controller performs the pre-feeding and continues with the second job.

4. The image reading apparatus according to claim 3, wherein the controller performs the pre-feeding over a distance shorter than in normal operation.

5. The image reading apparatus according to claim 2, wherein if the document is located where the document is not able to reach a predetermined speed when all the documents in the first document bundle are output, the controller does not perform the pre-feeding and discontinues the second job.

6. The image reading apparatus according to claim 5, wherein the controller issues a warning indicating that a document jam has occurred when the first job ends.

7. The image reading apparatus according to claim 2, further comprising:
   a sensor that detects a document transported to a position of the reader, wherein if the document is pulled in to a detecting position of the sensor when all the documents in the first document bundle are output, the controller does not perform the pre-feeding and discontinues the second job.

8. The image reading apparatus according to claim 7, wherein the controller issues a warning indicating that a document jam has occurred when the first job ends.

9. The image reading apparatus according to claim 1, wherein the controller changes a pre-feeding distance over which the pre-feeding is performed.

10. The image reading apparatus according to claim 9, wherein the controller performs the pre-feeding over a normal distance when the document in the second document bundle is not pulled into the image reading apparatus, and reduces the pre-feeding distance in accordance with a pull-in distance when the document in the second document bundle is pulled into the image reading apparatus.

11. The image reading apparatus according to claim 10, wherein if the pull-in distance is greater than or equal to a predetermined distance, the controller sets the pre-feeding distance to zero.

12. An image forming system comprising:
an image reading apparatus that reads an image of a document; and
an image forming unit that forms the image read by the image reading apparatus onto a recording medium,
wherein the image reading apparatus includes
a transport unit that transports the document,
a reader that reads the transported document,
a detector that detects whether or not a document bundle prior to being transported is present, and
a controller wherein, while a document in a first document bundle corresponding to a first job is being transported, if the detector detects that a second document bundle corresponding to a second job as a subsequent job is loaded, the controller changes pre-feeding operation for preliminarily pulling a document in the second document bundle into the image reading apparatus in accordance with a pull-in position of the document in the image reading apparatus.

13. An image reading apparatus comprising:
transport means for transporting a document;
reading means for reading the transported document;
detecting means for detecting whether or not a document bundle prior to being transported is present; and
control means wherein, while a document in a first document bundle corresponding to a first job is being transported, if the detecting means detects that a second document bundle corresponding to a second job as a subsequent job is loaded, the control means changes pre-feeding operation for preliminarily pulling a document in the second document bundle into the image reading apparatus in accordance with a pull-in position of the document in the image reading apparatus.

\* \* \* \* \*